Patented May 10, 1927.

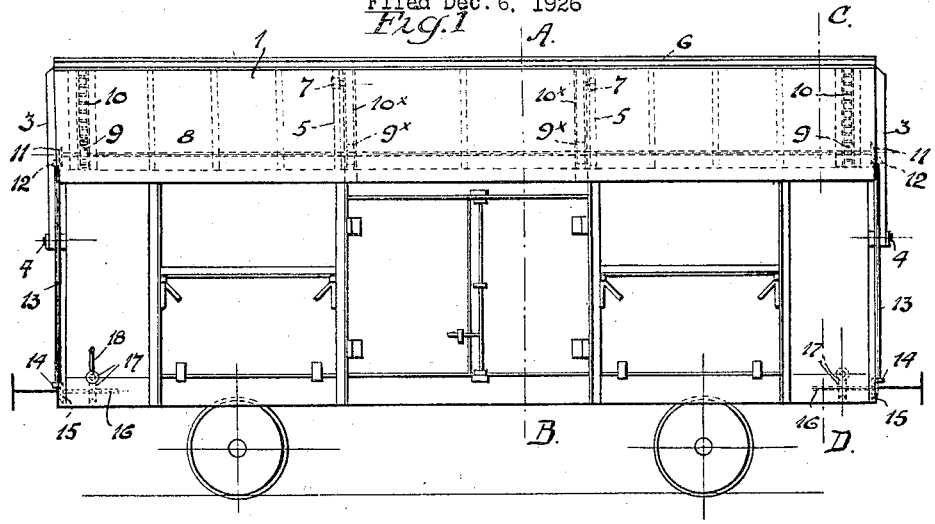

1,628,543

UNITED STATES PATENT OFFICE.

JONAS JONSSON, OF VANSBRO, SWEDEN.

TRANSPORT WAGON FOR RAILWAYS.

Application filed December 6, 1926, Serial No. 152,964, and in Sweden December 7, 1925.

For the transporting of charcoal, peat and the like by railway flat wagons generally are used, on which a railing is provided for holding the cargo. However simple the said railing is constructed, it is too expensive to remove the same from the wagon during the season, generally the summer, while no charcoal, for instance, is transported, a great set of wagons thereby giving no interest. Besides, the said provisional wagons have the disadvantage of the charcoal during the transportation being not protected against rain and snow and the risk of being ignited by sparks from the engine.

The object of the invention described below is to remove the said disadvantages by providing the wagons with a roof which is shiftable in a suitable manner. Owing to this arrangement the charcoal is protected against rain etc. but may, nevertheless, easily be put into the wagon after the roof has been pushed aside. Through the provision of suitable doors and shutters in the side walls of the wagon a rapid unloading also of wagons of this construction may be effected.

While the old wagons for transporting charcoal in consequence of their construction must be used almost exclusively for this purpose and for that reason must be parked, while there is no such transporting, wagons arranged in accordance with this invention on the other hand may be used also as luggage-vans and in fact the wagon constitutes, so to say, a universal goods-wagon suitable for transporting all kinds of goods by railway, especially when the goods ought to be protected against wind and weather for instance at the transporting of charcoal, peat, grain, food, timber and the like. Owing to this fact wagons arranged in accordance with this invention will reduce the demands of tarpaulins during the periods they are not used for the transporting of charcoal.

A wagon arranged in accordance with the invention is shown diagrammatically in the accompanying drawing in Fig. 1 in a side view and in Fig. 2 in an end view. Fig. 3 shows cross sections along the lines A—B and C—D respectively in Fig. 1.

The roof of the wagon shown in the drawing comprises two shutters 1 and 2 each constituting one half of the roof and extending longitudinally of the wagon. Said shutters may be moved laterally leaving the wagon wholly open for the charging of same with charcoal, peat, timber etc. Shutters 1 and 2 are carried by arms 3, which are swingable on trunnions 4, fixed to the end walls of the wagon and guiding the shutters, when moved laterally. Owing to this arrangement shutters 1 and 2 move along circular paths and, when occupying their open position, do not extend outside the profile of the wagon in any essential degree, as perceived from Fig. 2, which shows by dotted lines the shutters in open position. For the same purpose each shutter is curve shaped transversely, as shown. Shutters 1 and 2 may be supported at their central part for instance by curve shaped bars 5, fixed to the side walls of the wagon and to a central beam 6 provided at the uppermost part of the end walls and extending longitudinally of the wagon, rollers 7 being provided on the shutters 1 and 2 and running on the bars 5.

Shutters 1 and 2 may be shifted by means of shafts 8 extending longitudinally of the wagon and provided at their ends with toothed wheels 9 engaging curve shaped racks 10 fixed to the shutters at the ends of the same. On the shaft 8 rollers $9^x$ are fixed running in U-shaped bars $10^x$ fixed to the shutters and guiding the same longitudinally. Shafts 8 are provided at their ends with bevel gear wheels 11 engaging bevel gear wheels 12 fixed to vertical shafts 13. Each of the vertical shafts 13 is provided at its lower end with a bevel gear wheel 14 meshing with a bevel gear wheel 15 provided on a short shaft 16 which is rotated through a worm gear 17 and a crank 18. The said shutters may, evidently, be shifted in any other manner than the one described above.

I claim:

1. In a transport wagon for railways the provision of shutters extending longitudinally of the wagon and constituting the roof of the same, and of arms carrying the said shutters and swingable on trunnions in such manner that the shutters, when moved laterally outwards, do not extend in any essential degree outside the profile of the wagon.

2. In a transport wagon for railways the provision of shutters extending longitudinally of the wagon and constituting the roof of the same, arms carrying the said shutters and swingable on trunnions provided on the end walls of the wagon, and shafts for the shifting of the shutters, said shafts extending longitudinally of the wagon and provided with toothed wheels engaging racks on the shutters.

In testimony whereof I have hereunto affixed my signature.

JONAS JONSSON.